No. 701,989. Patented June 10, 1902.
J. B. BELL.
LINOTYPE MACHINE.
(Application filed Sept. 18, 1901.)
(No Model.) 10 Sheets—Sheet 1.

WITNESSES:
INVENTOR
Jerome B. Bell

No. 701,989. Patented June 10, 1902.
J. B. BELL.
LINOTYPE MACHINE.
(Application filed Sept. 13, 1901.)
(No Model.) 10 Sheets—Sheet 6.

WITNESSES:

INVENTOR
Jerome B. Bell
BY
Attorney

No. 701,989. Patented June 10, 1902.
J. B. BELL.
LINOTYPE MACHINE.
(Application filed Sept. 13, 1901.)
(No Model.) 10 Sheets—Sheet 7.

WITNESSES:

INVENTOR
Jerome B. Bell
Attorney

UNITED STATES PATENT OFFICE.

JEROME B. BELL, OF WILMINGTON, DELAWARE.

LINOTYPE-MACHINE.

SPECIFICATION forming part of Letters Patent No. 701,989, dated June 10, 1902.

Application filed September 13, 1901. Serial No. 75,325. (No model.)

*To all whom it may concern:*

Be it known that I, JEROME B. BELL, of Wilmington, in the State of Delaware, have invented certain new and useful Improvements in Linotype-Machines, of which the following is a specification.

My invention relates to that class of linotype-machines in which two or more magazines provided each with its own distributer are arranged to deliver their matrices to the same composing mechanism and are for this purpose combined each with a set of escapement devices adapted to be operated from a single keyboard, whereby matrices can be delivered from one magazine or the other at the will of the operator.

My invention consists in certain improvements in the matrix-delivering mechanism, as well as in the distributing mechanism, which will first be described in connection with the accompanying drawings, forming a part of this specification, and will then be more particularly pointed out in the claims.

In the drawings, Fig. 4 is a rear elevation of the same. Fig. 5ª is a rear elevation of a modification in which the transfer-belts are dispensed with. Figs. 11, 12, 13 are enlarged sectional side elevations, on enlarged scale, of the entrance or front ends of the three distributers. Figs. 12ª, 13ª are sectional end elevations of the middle and bottom distributers, respectively. Figs. 26 to 37 are similar views illustrative of a modification in which the selecting-teeth are located below the distributing-teeth.

The machine to which my improvements are represented as applied is in all its main features the well-known Mergenthaler linotype-machine in industrial use to-day. With a view to adapt it to carry a larger assortment of matrices than is practicable where a single magazine only is employed, so as to increase the capacity of the machine for various kinds of work, I superadd to the machine a number of magazines, which of course must be provided each with its own matrix-delivery mechanism and with its own distributing devices.

Figure 1:
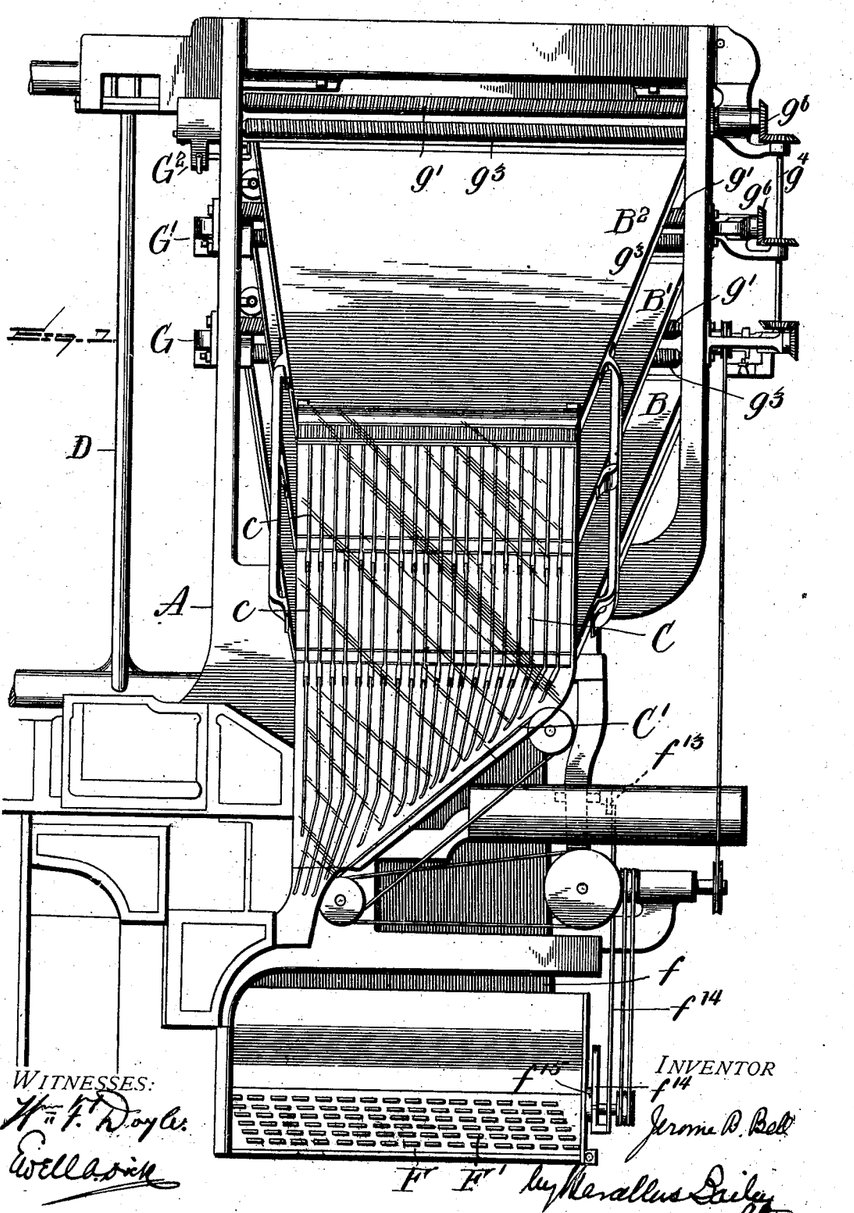
Figure 1 is a front elevation of so much of a linotype-machine as required to illustrate my improvements.
Figure 2:
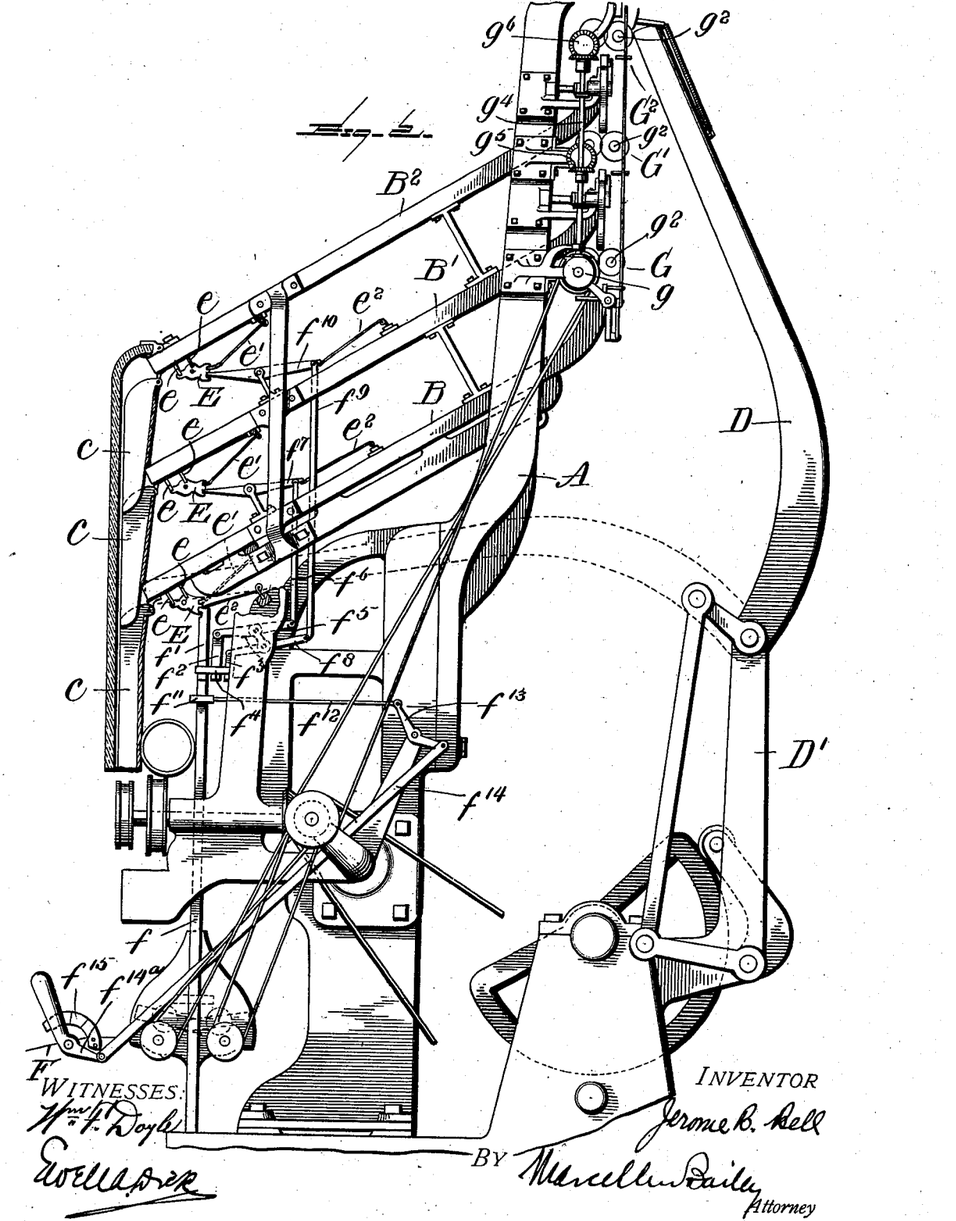
Fig. 2 is a right side elevation of the same.
Figure 3:
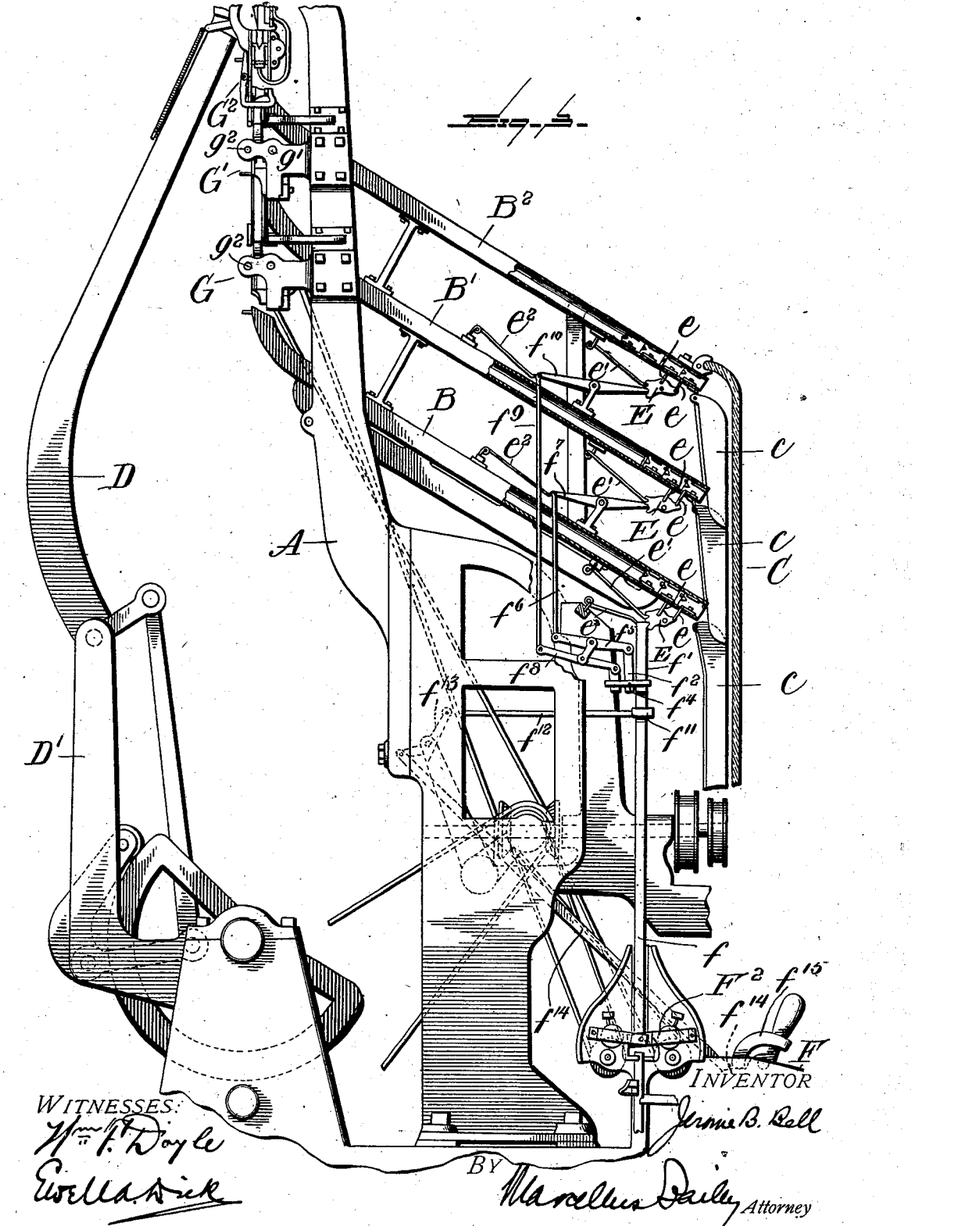
Fig. 3 is a left side elevation of the same.

Referring now more particularly to Figs. 1 to 3, A is the main frame of the machine. B is a magazine corresponding to the usual magazine of the commercial Mergenthaler machine and similarly placed. Above and substantially parallel to the magazine B are supported in the main frame a plurality of like magazines—in this instance two magazines B' B². All of them deliver their matrices through a series of channels C to one and the same composing mechanism of well-known construction, and the line of matrices after having been set up is conveyed in the usual way to the casting-point and the slug cast therefrom, after which the matrices are taken by the elevator-arm D and carried to the distributing-point, where they are distributed each to its own approximate magazine, as will be hereinafter described. The channels C are prolonged vertically, so that they will come opposite the discharge ends of all three of the magazines, which ends open directly into these channels, so as to deliver their matrices therein. The matrices fall through the channels onto one and the same traveling belt C', by which they are conveyed to the assembling-point in the customary way. The channels are formed by thin vertical metallic fins c, there being three fins in a vertical line, as seen in Fig. 2, each overlapping the other at their contiguous ends and being hinged at their upper ends to the rear of the channel-case. By removing the glass front of the case any one of the fins can be manipulated as desired. The delivery of the matrices from each magazine is effected by means of an escapement mechanism, one for each magazine and each independent of the others, which is similar to that employed in the commercial Mergenthaler machine and is too well known to require detailed description. In each magazine this escapement mechanism is composed, generally speaking, of an escapement-lever E, pivoted under each channel of the magazine and provided with two pins or pawls $e$, which by the vibration of the lever are projected alternately up through the bottom of the magazine into the channel. A spring $e'$ tends to turn the escapement-lever in a direction to depress the lower pawl, while a stronger spring $e^2$ normally pulls down the escapement-lever, so as to lift the lower pawl and depress the upper pawl. It is my object to operate all of these series of escapements from one and the same keyboard, and to this end I proceed as follows: F is the usual keyboard of a Mergenthaler machine, and F' represents the keys. These keys operate on a set of vertical keybars or reeds $f$, which are actuated from the keys in the usual way, the usual auxiliary power mechanism, by which the movement of the type-reeds $f$ commenced by the keys is completed, being shown at F². The reeds or type-bars $f$, which may be termed the "main reeds," do not, however, connect directly with the escapement-levers, as in the ordinary Mergenthaler machine, but they are arranged to act upon devices, of which there are three sets, connected one to each of the three sets of escapements, these devices terminating at a point adjoining the upper ends of the main reeds $f$ in what may be termed "auxiliary" reeds or type-bars, (seen at $f'$ $f^2$ $f^3$, respectively.) These auxiliary reeds are supported and spaced in a stationary comb $f^4$, in which they are capable of up-and-down movement. The auxiliary reeds $f'$ are connected directly to the escapement-lever of the lowest magazine B, just as the type-bar is connected to the escapement-lever of the ordinary Mergenthaler machine. The auxiliary reeds $f^2$ $f^3$, being further removed from their escapements, are connected thereto by suitable intermediaries. The reeds $f^2$ are connected to their escapements by being jointed to one end of pivoted levers $f^5$, which at the other end are, through jointed connecting-rods $f^6$, connected to the rear ends of pivoted levers $f^7$, the latter at their front ends engaging the escapement-levers of the magazine B'. The reeds $f^3$ are by similar devices $f^8$, $f^9$, and $f^{10}$ connected to the escapement-levers of the magazine B².

The auxiliary reeds of the magazines above the lowest pass through between the channels of the magazines below their own—as, for example, the reeds $f^2$ pass through their openings between the channels of the magazine B, and the reeds $f^3$ pass through their openings between the channels of both the magazine B and the magazine B'. In this way I am enabled to obtain a very much more direct connection of the reeds with their respective escapements than would otherwise be practicable.

The main reeds $f$ are capable of tilting upon their lower ends or bars back and forth from front to rear of the machine, and vice versa, so that their upper ends may be brought under and in register with the closely-adjoining lower ends of either one of the three sets of auxiliary reeds $f'$ $f^2$ $f^3$, and to facilitate the proper alinement the latter are arranged with slightly-converging lower ends upon the arc of a circle of which the base or tilting point of the main reeds is the axis. As the main reeds are of considerable length, a very slight tilting movement will suffice to bring their upper ends into register with any selected set of auxiliary reeds, and in this way any one of the auxiliary sets of reeds can be operated to the exclusion of the others. This I believe to be new with me beyond the structural embodiment thereof which I have illustrated in the drawings. The adjustment of the main reeds for this purpose can be effected in various ways. One convenient way, as shown in the drawings, is to provide a guide-comb $f^{11}$, through which they pass and through which they can move freely up and down, which comb is mounted at the ends in bearings in the frame, in which it can slide back and forth from front to rear, and vice versa. In this movement it will carry the main reeds with it, the latter thus being tilted, so as to bring them under and in alinement with any one of the three sets of auxiliary reeds. In order to thus move the comb, I joint it, as seen in Fig. 2, by a connecting-rod $f^{12}$ to one end of a lever $f^{13}$, pivoted to some suitable portion of the main frame and connected at the other end by a rod $f^{14}$ to one arm of an adjusting-lever $f^{14a}$, pivoted alongside of the keyboard in a position where its handle end will be in convenient proximity to the operator, the handle being provided with a spring detent or catch to engage any one of the three notches in a stationary toothed or notched segment $f^{15}$, according to which one of the three sets of auxiliary reeds $f'$ $f^2$ $f^3$ is to be brought into action. The operator thus can at will change from one to the other magazine conveniently and expeditiously, and as to the mechanical parts themselves they are largely duplications of parts to be found in the existing linotype-machine and can be superadded to that machine economically and without requiring much if any material structural change in it.

Figures 14, 15, 16, 17, 18, 19, 20, 21, 22, 23, 24, 25:
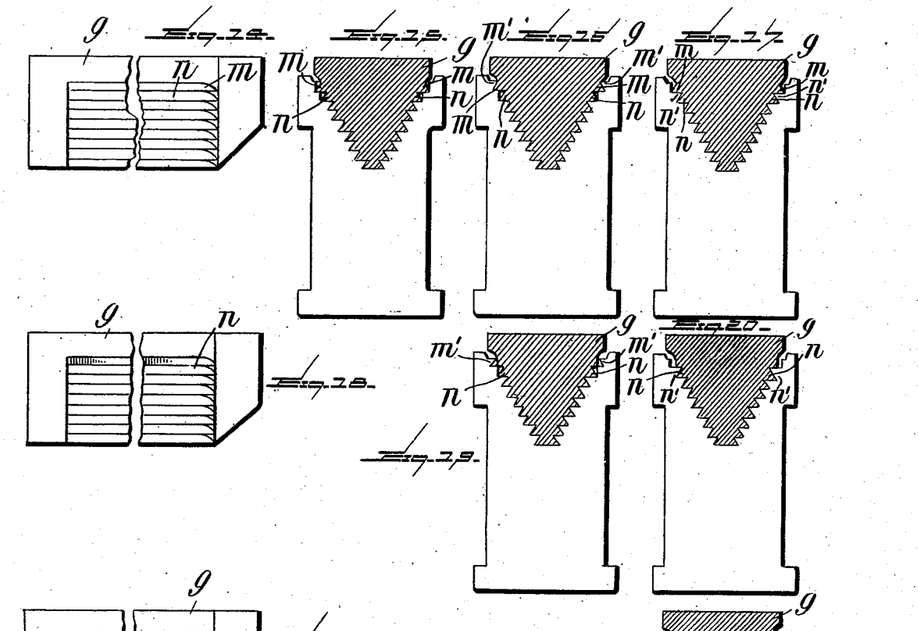
Figs. 14 to 25 are views illustrating the manner in which the matrices belonging to the several magazines are separated from one another during the process of distributing them. In these figures the selecting ribs or teeth are formed at the top of the distributer-bars and matrices above the distributing ribs and teeth with which they respectively are provided.
Figures 22, 26:
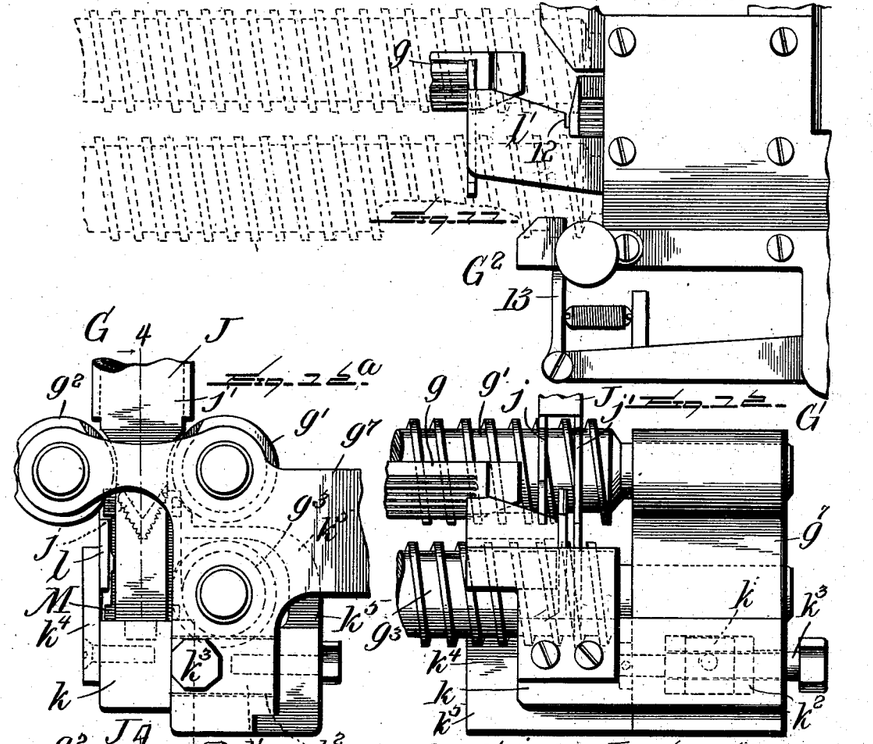
Figure 25:
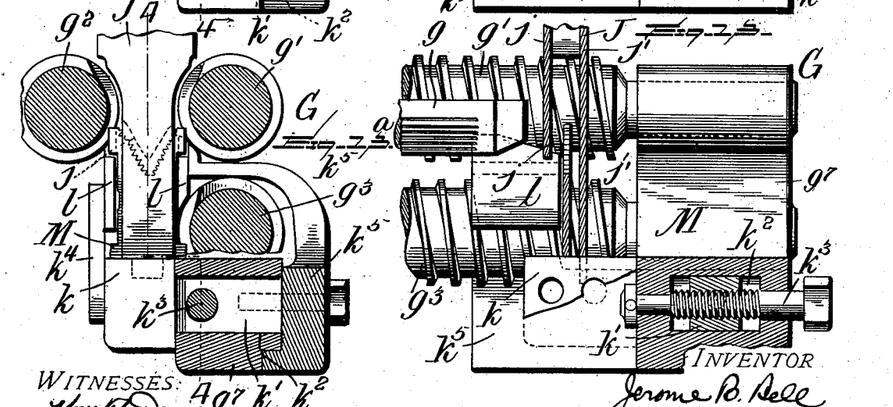

The matrices used in this machine are the same as the ordinary linotype-matrices now in use, with one feature superadded, which will be presently described. Each magazine also is provided with a distributer, (seen at G G' G², respectively.) Each of these distributers contains a longitudinally ribbed or toothed distributing-bar $g$ and horizontal feed-screws $g'$ $g^2$ $g^3$, arranged and operating (with the exception of one structural superadded feature hereinafter referred to) like the corresponding devices in the ordinary linotype-machine. All of the matrices of the composed line after the slug is cast are lifted to the topmost distributer $G^2$ by the elevator-arm D, which has the same construction and mode of operation as in the ordinary linotype-machine. In order to permit it to reach the topmost distributer, it is raised from the position which it occupies in the ordinary linotype-machine, being mounted on an extension-bracket D', fixed to the main frame. The mechanism for operating it is shown clearly in Fig. 2, and being substantially the same as that employed for the same purpose in the ordinary machine needs no further explanation. The topmost distributer $G^2$ is similar in all general respects to the ordinary linotype-distributer and receives and takes care of the matrices of its own magazine in the same way; but the matrices belonging to the other magazines, although they all pass through the first distributer, are not there distributed, but pass on to their own appropriate magazines. In other words, while all of the matrices pass through the topmost distributer $G^2$ only those which pertain to the topmost magazine $B^2$ are there distributed. Those which belong to the second and third magazines pass through and out from the far end of the first distributer into the second distributer G', where those which belong to the middle magazine B' are selected out and distributed, while those which may belong to the lowest magazine B pass through and out from the far end of the second distributer G' into the lowest distributer G, where they are distributed to their magazine B. Thus each matrix belonging to one of the lower magazines passes through the whole length of the distributer or distributers of the magazine or magazines above before it reaches its own distributer. The manner in which this is effected will be readily understood by reference to Figs. 14 to 25. The distributer-bar $g$, Fig. 14, of the topmost distributer $G^2$ has, in addition to the usual longitudinal distributing-ribs, two additional ribs $m$ $n$, which I shall term "selecting-ribs," located in this instance on each side above the distributing-ribs and extending the whole length of the bar. The distributer-bar, Fig. 18, of the second distributer G' has only one of these ribs on each side—the rib $n$—while the distributer-bar of the third or lowest distributer G has no selecting-ribs whatever. The matrices of the topmost or first magazine $G^2$ have simply the ordinary distributing-teeth, Figs. 15, 23, the matrices of the second or middle magazine G' have in addition to the ordinary distributing-teeth selecting-teeth $m'$, positioned to engage the ribs $m$ on the first distributer-bar, and the matrices of the third or lowest magazine G have in addition to the ordinary distributing-teeth selecting-teeth $n'$, positioned to engage the selecting-ribs $n$ of the first and second distributer-bars. In Figs. 23, 24, 25 are shown end views of the three distributer-bars with their appropriate matrices directly below them, but separated from them by an interval. Thus when the charge of matrices (which may belong indifferently to any one of the three magazines) is delivered to the first distributer in the usual way it will be seen by reference to Fig. 15 that the matrices belonging to the top magazine do not engage the selecting-ribs of the distributer-bar, and are therefore free to be distributed, while those which may belong to the magazine below engage one or the other sets of selecting-ribs $m$ $n$, and are therefore carried along to the far end of the distributer-bar, whence (by appropriate means hereinafter described) they are conveyed to the second distributer. In this distributer (see Figs. 19, 20) the matrices of the second magazine are free from engagement with the selecting-ribs, as seen in Fig. 19, and are therefore free to be distributed in the usual way; but the matrices of the third magazine engage the selecting-ribs $n$ of the second distributer-bar, as seen in Fig. 20, and are therefore carried along without distribution to the far end of that distributer-bar, whence they are conveyed to the third or lowest distributer, and as the distributer-bar in this distributer has no selecting-ribs at all the matrices pertaining to the third or lowest magazine are free to be distributed to that magazine, as indicated in Fig. 22.

In Figs. 14 to 25 the selecting-ribs $m$ $n$ are located above the distributing-ribs on the distributer-bar, and the selecting-teeth $m'$ $n'$ are located above the distributing-teeth therein; but these ribs and teeth can be located below instead of above the distributing ribs and teeth, as illustrated clearly in Figs. 26 to 37, wherein the selecting-ribs $m$ $n$ are shown located below the distributing-ribs on the distributer-bars and the selecting-teeth $m'$ $n'$ are shown located below the distributing-teeth in the matrices. These views, Figs. 26 to 37, follow the same order as Figs. 14 to 25 and are figure for figure the same, save in the changed location of the selecting ribs and teeth, and the mode of operation is the same, as will be understood without detailed explanation.

Motion may be imparted to the feed-screws of the several distributers in any suitable way. In this instance motion is imparted to the lowermost distributer by belting in the usual way, as seen, for example, in Fig. 2. From the lower distributer motion can be imparted to the feed-screws of the two upper distributers through any suitable intermediaries; but I prefer, in order to insure as far as practicable absolute uniformity and regularity of movement, to transmit movement from the first to the other distributers by means of positive gearing, for which purpose I employ a vertical shaft $g^4$ in connection with bevel gear-wheels $g^5$ $g^6$, as seen more plainly in Figs.

Figures 5, 7:
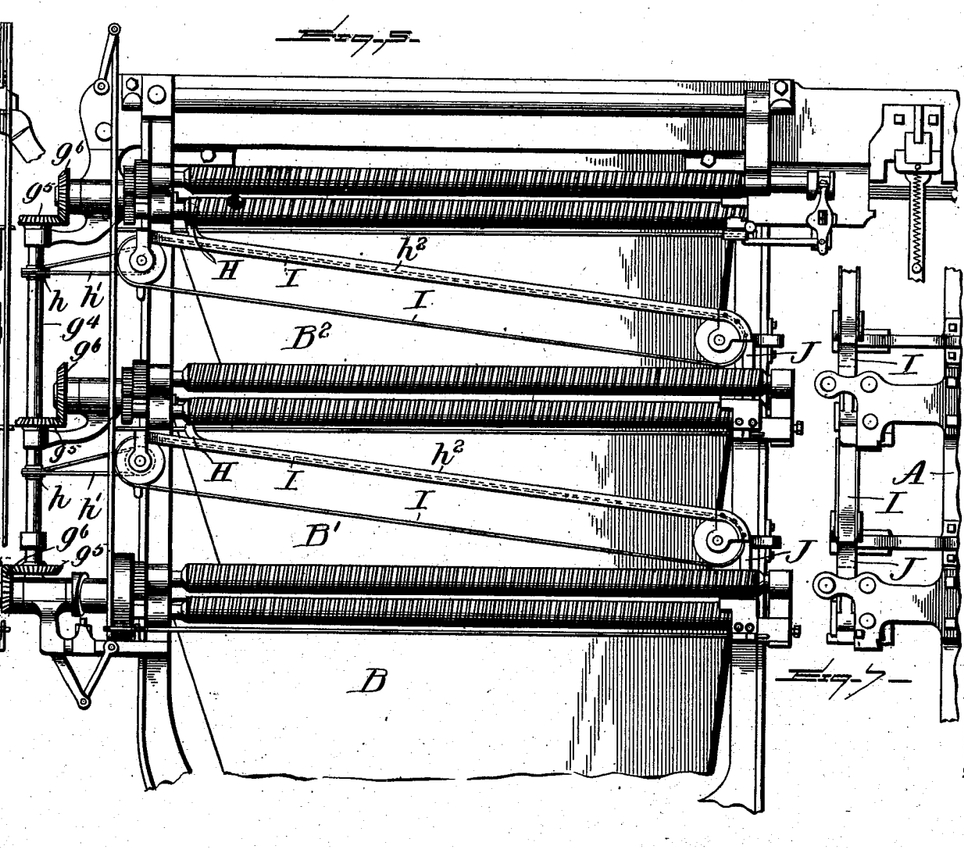
Fig. 5 is a rear elevation, on enlarged scale, of a portion of the machine to exhibit more clearly the arrangement of carrier-belts for transferring the matrices of the second and third magazines to their respective magazines.
Figs. 6 and 7 are elevations from the right and left sides, respectively, of this part of the machine.
Figure 6:
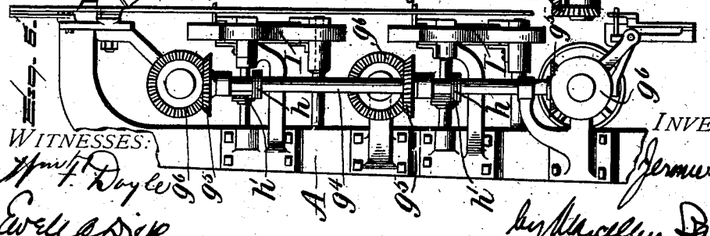

5 and 6, by which the feed-screws of the distributers are driven positively and with uniformity.

Figures 8, 9, 10:
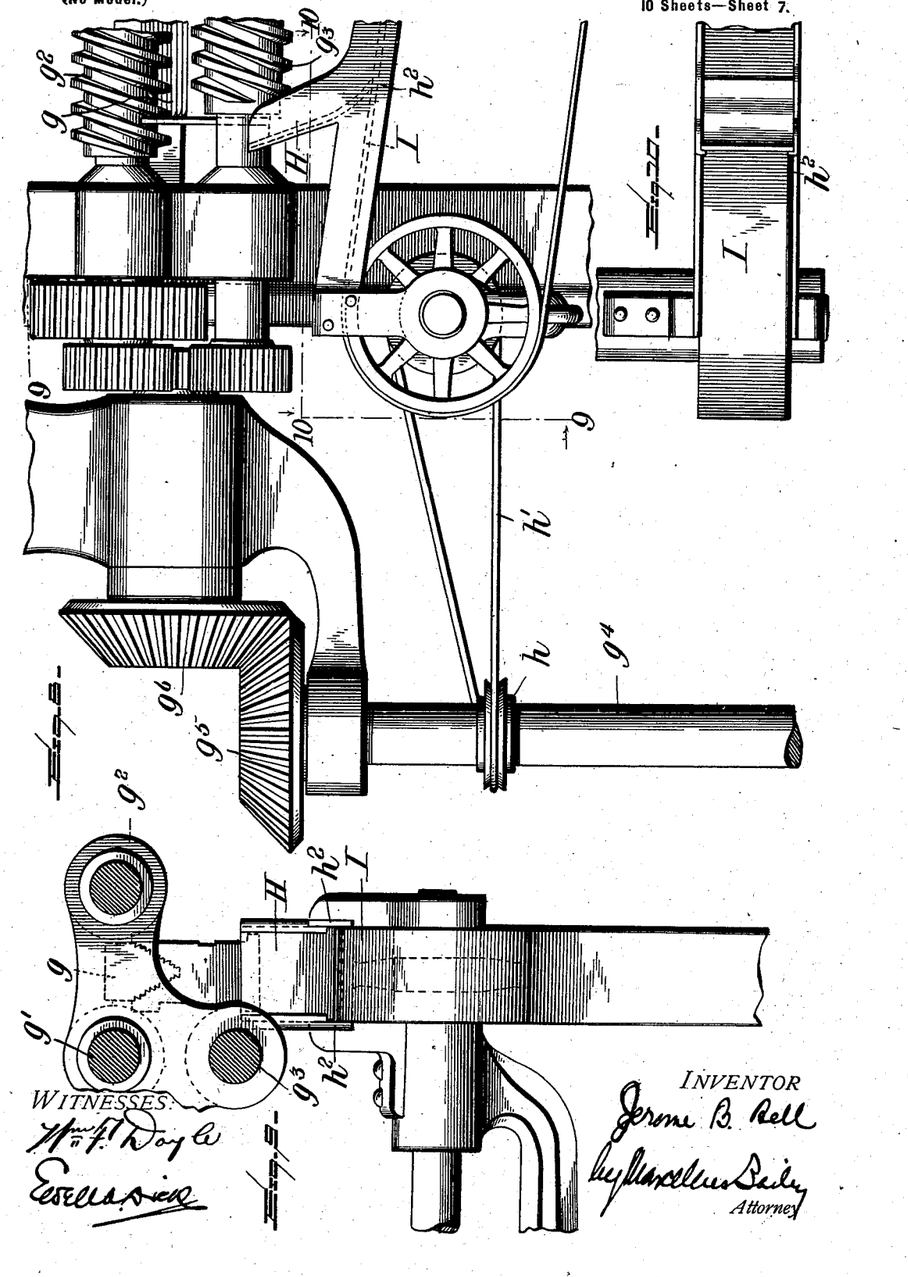
Fig. 8 is a still more enlarged rear elevation of one end of the distributers, together with a portion of the transfer-belt used in connection with the same.
Fig. 9 is a section on line 9 9, Fig. 8.
Fig. 10 is a section on line 10 10, Fig. 8.

In the arrangement shown in Figs. 4 and 5 the undistributed matrices discharged from the far end of the topmost distributer G² are conducted through chute H to an inclined endless traveling transfer-belt I, upon which they are carried back to a point over the entrance end of the second distributer G', to which they pass through a chute J. A similar arrangement (similarly designated by reference-letters H I J) is provided for conducting the undistributed matrices from the far end of the middle distributer G' to the entrance end of third or lowest distributer G. Each belt H is driven from shaft $g^4$ by pulleys and belting $h\ h'$, Fig. 5. Each belt on its upper side moves between stationary guide-flanges $h^2$, Figs. 5, 8, which serve to assure the matrices in proper position on the transfer-belt. Fig. 8 shows an enlarged view of a portion of one of the flanges $h^2$, together with the discharge-chute H, with its mouth in position to receive the matrices which may drop from the distributer above.

Figure 5A:
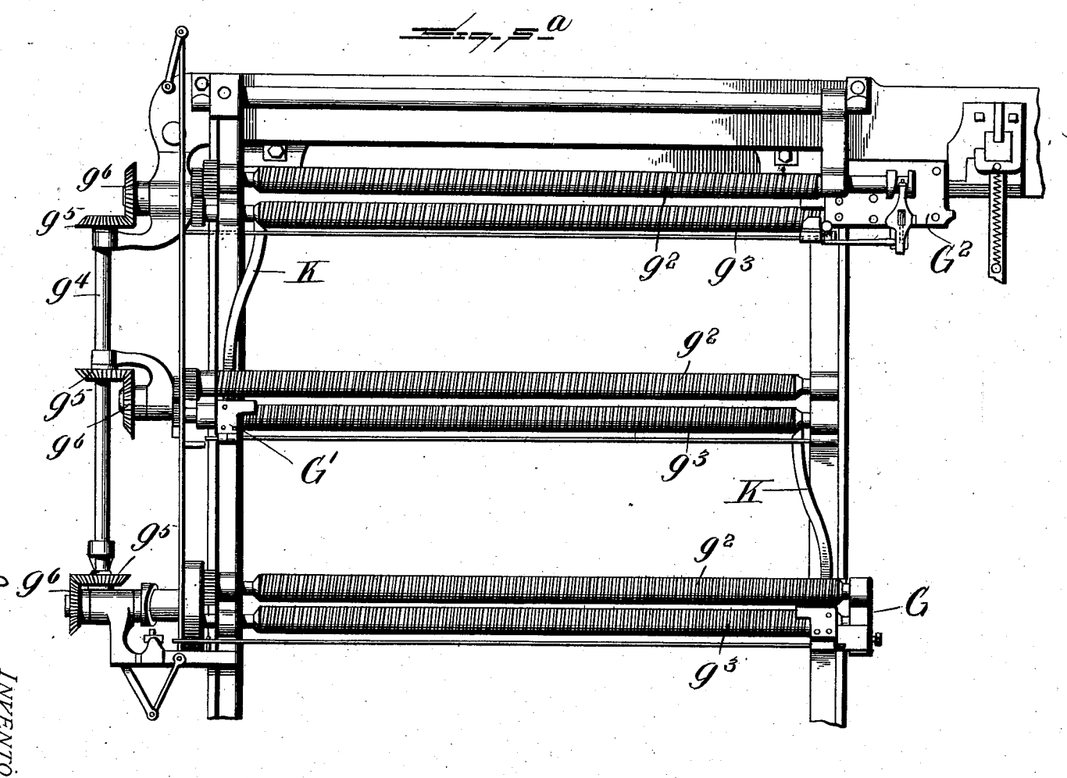

Fig. 9 shows a matrix about to drop from the distributer into chute H. In this arrangement the entrance end of each distributer is at the same end or side of the machine. Therefore the transfer-belts I are required to carry back the matrices which either of them may receive from the discharge end of the distributer above to the entrance end of the distributer next below. The feed-screws also of all the distributers in this arrangement are geared to revolve in the same direction. I can, however, dispense with the transfer-belts or any other devices for the same purpose by reversing the entrance end in each alternate distributer, so that the entrance end of the middle distributer G' will be directly under the discharge end of the top distributer G² and the entrance end of the bottom distributer G directly under the discharge end of the middle distributer G', or, in other words, so that the undistributed matrices will enter the successive distributer alternately from opposite ends thereof. In this case it will be only necessary to provide a chute leading from the discharge end of the distributer above directly down to the entrance end of the distributer next below. Such an arrangement is illustrated in Fig. 5ª, in which the chutes just referred to are shown at K. In this modification manifestly the feed-screws of the middle distributer G' must revolve in the opposite direction to the direction in which the feed-screws of the top and bottom distributers G² G revolve, and the driving-gearing of the middle distributer is shown as modified to effect this change, the beveled gear $g^5$ for the middle distributer being shown above the gear 6 in Fig. 5ª instead of below it, as seen in Fig. 5. Under this arrangement not only must the feed-screws of the middle distributer be reversed, but the distributer-bar as well, and the permutations of the distributing-teeth on the matrices pertaining to this distributer must be correspondingly varied, as will be understood without further explanation.

In order to insure the proper and speedy delivery of the matrices from either the chute J or the chute K to the feed-screws of the distributer with which said chute is associated, it is requisite that the delivery end of the chute should be accurately positioned with reference to the threads of the feed-screws and that there should be capacity for adjustment of the delivery end of the chute in case its normal relations to the feed-screw threads should be disturbed. As a convenient and efficient means for attaining this result I make use of the arrangement shown in Figs. 12, 13, 12ª, 13ª. I have illustrated this particular arrangement in connection with the chutes J; but it will be understood that the same is applicable to the chutes K.

Figs. 12, 12ª also represent the devices at the entrance end of the middle distributer and Figs. 13, 13ª the devices at the entrance end of the bottom distributer; but, in fact, so far as concerns the particular feature in question the instrumentalities at the entrance end of each of these two distributers are the same, and of the figures in question Figs. 12, 12ª are elevations and Figs. 13, 13ª are sectional views of the same set of devices in whichever of the two locations they may be used. In these figures $j\ j'$ are the inner and outer walls, respectively, of the lower or delivery end of the chute J. They project down between without contacting with the feed-screws $g'\ g^2$. The inner wall $j$ is V-shaped at its lower end and is short enough to allow the matrix to be carried along under it by the feed-screws. The outer wall $j^2$ of the chute is prolonged downward and is fastened to a block $k$, the top of which forms the floor upon which the base of the descending matrix (shown at M) rests, the floor being of such height that when the matrix brings up against the floor its ears will engage the threads of the three feed-screws, as indicated in Figs. 12ª and 13ª. As the matrix is by the threads of the revolving feed-screws carried forward out from under the front wall $j$ of the chute its top ears pass up over inclined rails $l\ l$, and the matrix is thus as it travels along raised to a position where it will engage the ribs on the distributer-bar $g$. It is desirable to adjust the delivery end of the chute with reference to the intervals between the threads of the feed-screws, so that when the matrix descends its ears shall enter into those intervals. To this end I make the chute at its lower end with reference to the screws, for which purpose the block $k$, to which it is attached by its outer wall $j$, is made adjustable lengthwise of the screws. The block $k$ is provided with a laterally-extending tenon $k'$, which fits and is capable of back-and-forth movement (in a direction lengthwise of the feed-screws) in a mortise or slot $k^2$, formed for its reception in the fixed bracket $g^7$, in which the feed-screws at this end of the machine are housed. By means of an adjusting-screw $k^3$, swiveled in the bracket, as seen more clearly in Fig. 13, the block, and consequently the lower end of the chute J, can be moved back and forth. A slight movement only is requisite to effect the adjustment. It is desirable also that the rails $l\,l$ should partake of this movement of adjustment, so as to maintain their outer ends in proper relation to the matrix, and for this purpose they are attached to the block $k$, the one by a plate $k^4$, secured directly to the block, as seen in Figs. 12, 12$^a$, and the opposite one by a bracket-arm $k^5$, secured to the tenon $k'$, as seen in Figs. 12$^a$, 13$^a$.

In the arrangement just described it will be noticed that the matrices are so delivered by the chute as to engage the screws, their ears entering the intervals between the screw-threads. Thus all auxiliary devices such as heretofore have been used to feed or carry forward the delivered matrices to the feed-screws are done away with.

Fig. 11 represents a portion of the delivery end of the top distributer G$^2$. It is, as before said, to be associated with the devices usually employed in connection with the elevator-arm D to convey the matrices therefrom to the feed-screws. The usual rails employed at this point are shown at $l'$, each provided, as customary, with a matrix-arresting shoulder $l^2$, arranged directly over a reciprocating lifting-finger $l^3$, which raises the matrix clear of the shoulder and into engagement with the feed-screws. Mechanism of this kind is in general use and needs no further description.

Having described my invention and the manner in which the same is or may be carried into effect, I state in conclusion that I do not limit myself strictly to the structural details herein shown and set forth in illustration of my improvements, for manifestly the same can be considerably varied without departure from the spirit of the invention; but

What I claim herein as new, and desire to secure by Letters Patent, is as follows:

1. In a linotype-machine the combination of a plurality of superposed magazines; an independent set of escapements for each magazine; an auxiliary reed and connections between the same and the escapement for each magazine, there being one longitudinal row of auxiliary reeds for each magazine, and the several rows being located one to the rear of the other; a set of operating-keys; a main reed for each key; and means for shifting all of the main reeds bodily in a direction from front to rear or vice versa into operative relation with either one of the rows of auxiliary reeds to the exclusion of the others, substantially as and for the purposes hereinbefore set forth.

2. In a linotype-machine the combination of a plurality of superposed magazines, an independent set of escapements for each magazine, a set of auxiliary reeds for each set of escapements, said auxiliary reeds of each set of escapements above passing up through the magazine or magazines below between the channels therein; connections between the upper end of each auxiliary reed and its appropriate escapement, a set of operating-keys, a main reed for each key, and means for shifting all of the main reeds bodily and together into operative relation with either one of the sets of auxiliary reeds to the exclusion of the others, substantially as and for the purposes hereinbefore set forth.

3. In combination with the feed-screws of a linotype-distributer, a matrix-conducting chute through which matrices are fed to the feed-screws, having its lower end adjustable lengthwise of the screws with reference to the threads thereon substantially as and for the purposes hereinbefore set forth.

4. In a linotype-machine having a plurality of superposed magazines and distributers, one for each magazine, combined with means for delivering a line of matrices from all the magazines to the topmost distributer and passing the same first through that distributer and thence through the other distributers in succession, reversely-arranged distributers each having a ribbed bar and feed-screws located so that the discharge end of the distributer above shall be over and in communication with the entrance end of the distributer next below, and actuated so that the feed-screws of any one distributer shall feed in a direction opposite to that in which the feed-screws of the next adjacent distributer feed, substantially as and for the purposes hereinbefore set forth.

5. In combination with the feed-screws and distributer-bar of a linotype-distributer, a matrix-conducting chute through which matrices are delivered to the feed-screws, and inclined rails by which the matrices as they are fed along are raised into engagement with the distributer-bar, said chute and inclined rails being adjustable bodily and together lengthwise of the feed-screws, substantially as and for the purposes hereinbefore set forth.

6. In combination with the feed-screws and distributer-bar of a linotype-machine, a matrix-conducting chute through which the matrices are delivered to the distributer, having its delivery end directly over the threads of the feed-screw, so that the ears of the delivered matrix shall enter between and engage the threads of the feed-screws and a floor or stop for arresting the further descent of the matrix below this position, substantially as and for the purposes hereinbefore set forth.

In testimony whereof I have hereunto set my hand this 30th day of August, 1901.

JEROME B. BELL.

Witnesses:
EWELL A. DICK,
E. K. LUNDY, Jr.